United States Patent [19]
Yamazaki et al.

[11] 3,788,570
[45] Jan. 29, 1974

[54] SPINNING REEL FOR FISHING

[75] Inventors: Tatsuya Yamazaki, Fuchu; Yasomatsu Morishita, Kure, both of Japan

[73] Assignee: Ryobi Ltd., Fuchushi, Hiroshima-ken, Japan

[22] Filed: Aug. 4, 1971

[21] Appl. No.: 168,864

[30] Foreign Application Priority Data
Dec. 12, 1970 Japan..........................45-124086
Mar. 4, 1971 Japan............................46-13928
Apr. 28, 1971 Japan............................46-33804

[52] U.S. Cl............................................. 242/84.21 R
[51] Int. Cl............................................. A01k 89/00
[58] Field of Search... 242/84.2 G, 84.2 R, 84.21 R, 242/84.21 A

[56] References Cited
UNITED STATES PATENTS
2,344,209  3/1944  Lowe ............................ 242/84.21 R
2,799,457  7/1957  Martini ......................... 242/84.21 R
3,499,613  3/1970  Sarah ............................ 242/84.21 R
2,690,309  9/1954  Cuonz et al................... 242/84.21 R FOREIGN PATENTS OR APPLICATIONS
498,460  1/1939  Great Britain................. 242/84.2 G Primary Examiner—Billy S. Taylor
Attorney, Agent, or Firm—Fidelman, Wolffe, Leitner & Hiney

[57] ABSTRACT

A fishing spinning reel having a unitary rotor, gear pipe, and pinion engaging a unitary crown gear and axis pipe which has a polygonal bore, at a point skew to the radius of the crown gear. The rotor is retained in the main body by a stopper plate which is inserted in a radial slot on the gear pipe through a slit in the main body. The bail roller assembly has its roller separated from its axis by an oil-absorbent synthetic resin which is uneffected by water.

3 Claims, 6 Drawing Figures

SPINNING REEL FOR FISHING

FIELDS OF THE INVENTION

There are two kinds of reels for fishing, the one is a drum-type reel and the other is a spinning reel. The former is expensive because it is large and its mechanism is complicated. On the contrary, the latter is inexpensive because it is small and the mechanism is comparatively simple. Therefore, the latter has been used more widely.

The reel of this invention is directed to the latter, i.e., the spinning reel, comprising a main body and a rotor or revolving assembly. The revolution of a handle on the main body is transmitted to the rotor by engaging a crown gear with a pinion, and a fishing line is wound on a spool which is installed within the rotor and moves back and forth. The line can be extended by hanging it on a bail arm roller which is placed at the wall of the rotor.

THE PRIOR TECHNIQUE OF THE INVENTION

Generally, to make a spinning reel, a pinion to transmit the revolution of a handle to a rotor and the rotor itself are made separately. The pinion is fitted in a hole at the center of the rotor to be fixed on the revolving side, fitted in the inside of a main body to make it engaged with a crown gear, and then, to prevent the pinion to slip out of the main body, fitted a check plate in a loop slot of the pinion which is at the side of the rotor and fixes the check plate to the main body by screws. Therefore, the reel has defects that not only the fabrication is complicated because high accuracy is required in the centering of the rotor and the pinion, but also the reel tends to become cranky during the operation.

In the system of transmitting the revolution of a handle to a pinion with a crown gear, a pipe axis is attached to the crown gear, and the crown gear is kept in a fixed position by fitting the pipe axis to a long and slender axis, one end of which is fixed on the handle. Since these parts are made of different material and hence the expansion coefficients are different, mutual fitting becomes necessary and wastes due to the complicated manufacturing process and to the production of inferiority goods are large. And also, if we want to make the mutual fitting unnecessary, excessive accuracy is required in manufacturing and hence the cost becomes high. Furthermore, in a bail arm roller assembly hooking a line, the inside of a metalic roller is bored and the revolving force of the roller is made large by supplying the lubricating oil to the bored hole and make the frictional coefficient between the roller and the axis small. Such a system, however, has a defect that, while fishing, the water sticking on a fishing line is poured in the hole and lets the lubrication oil go out. Since the roller and the axis are both metal, if there is no lubrication oil between them, they tend to burn and make the load large and the revolution becomes impossible and thus make the winding operation difficult and non-smooth resulting in loss of fish.

THE OUTLINE OF THE INVENTION

This invention is an improvement to remove the abovementioned defects.

One of the objects is, therefore, to simplify the manufacturing and assembling process and make mass production possible to supply fine and cheap reels.

Another object is to make a crown gear transmitting a revolution of a handle to a rotor and pipe axis to be attached to an axis of a crown gear as a unit form by a metal type for casting and thus to produce uniform products in a large scale, whereby fine reels are supplied which are low-priced and interchangeable, and which have beautiful appearance and which do not need secondary work.

A further object is to supply inexpensive bail arm rooler assemblies which maintain smooth revolution without being influenced by water sticking on a line.

THE BRIEF DESCRIPTION OF THE DRAWINGS

The drawings represent embodiments of the present invention, in which.

DETAILED EXPLANATION OF THE INVENTION

Figure 1:
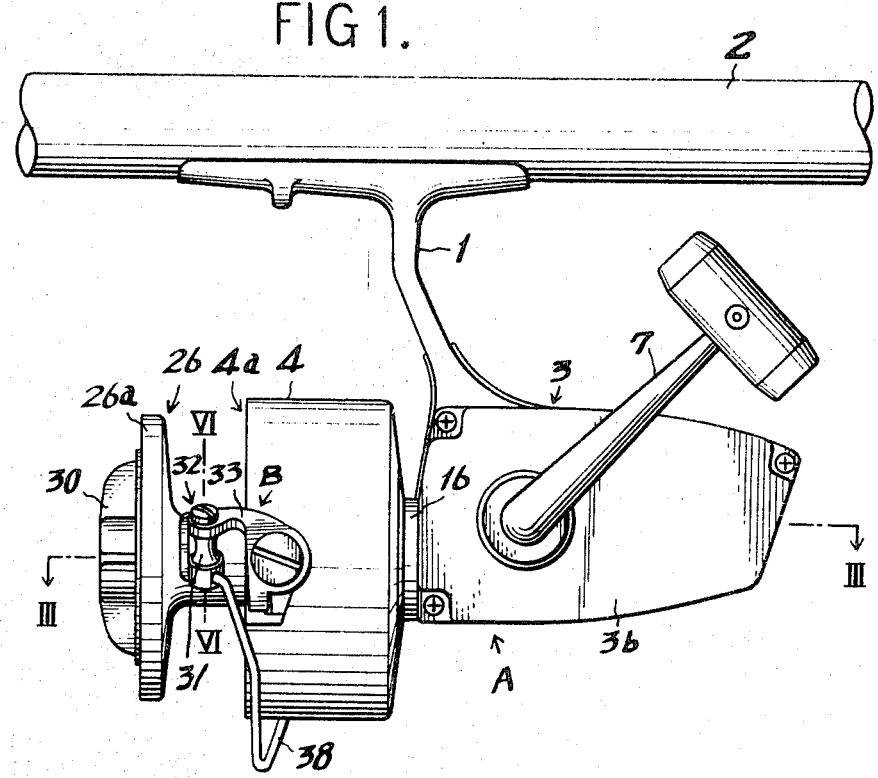
FIG. 1 is a side view of the reel attached to a rod.
Figure 2:
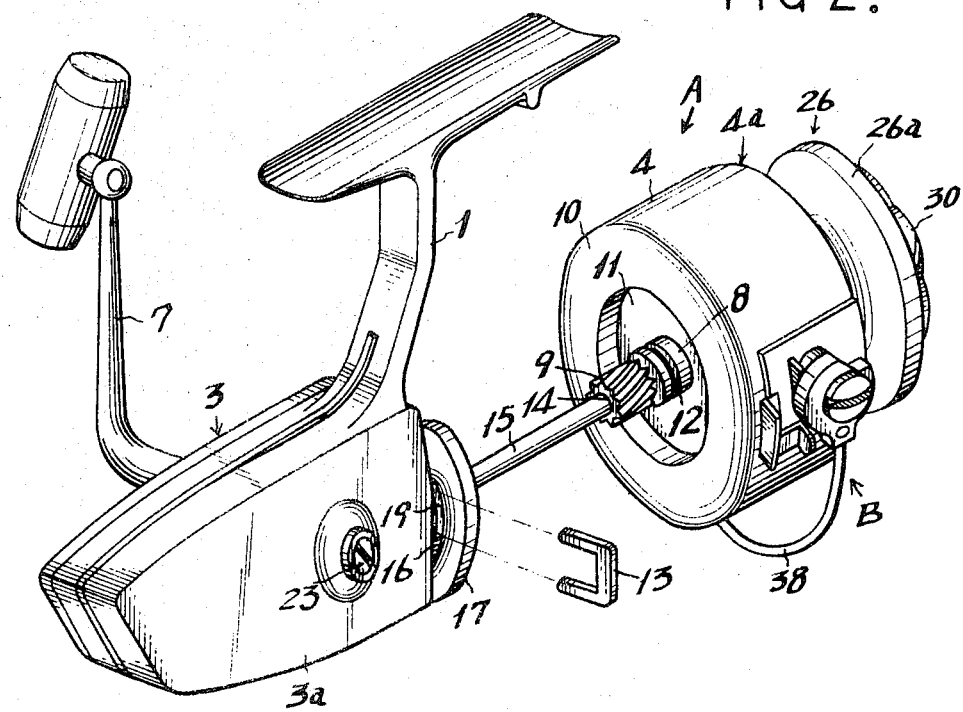
FIG. 2 is a perspective view of a main body and a rotor separated therefrom.

This invention relates to an improved spinning reel for fishing which has a bail fixed to a rotor or revolving assembly by a bail hinge so that the bail can be rotated freely, and in which transmittion of the revolution of the handle to the rotor is made by a crown gear. In this reel, a pinion, a gear pipe, with a slot around the leading edge of the pinion, and rotor are made as one integral unit. After fitting the gear pipe inside a main body, a stopper plate is inserted in to the slot in the gear pipe and a matching slot in the main body so that the gear pipe is secured in the main body and can rotate freely. Further, a pipe axis with polygonal internal section and the crown gear which is adapted to engage the pinion, are made as one unit. A polygonal axis which is fitted to the handle is inserted in the pipe axis. In the hole drilled inside the roller of the bail, axis holder of oil-absorbent synthetic resin is fitted and constitutes the axis holder of the axis which is attached to the closing section as one body. Thus, the present invention relates to a spinning reel with the abovementioned characteristics.

Detail description is made hereafter by referring to the drawings showing the embodiments of this invention.

Reel A, from the top of which a foot 1 is sticking out and a rod 2 is fixed on it, consists of a main body 3 and a rotor 4. A crown gear 5 which is located in main body 3 is mounted to one end of axis 6 and a handle 7 is attached to the other end of axis 6. Pinion 9 which forms one end of gear pipe 8, engages the crown gear 5 and thus the revolutions of handle 6 are transmitted to the gear pipe 8 via axis 6, crown gear 5 and pinion 9.

The rotor 4 is hollow and the one side thereof is open at 4a and the other side is closed by a side wall 10. Around the center of the side wall 10, there is a round dented section 11 which is convex inside and at the center of which the gear pipe 8 extends. The rotor 4 and gear pipe 8 are integrally composed as one unit by a cast zinc-alloy or the like. On one end of the gear pipe 8 a pinion 9 is cut and around the leading edge of the pinion 9 a loop slot 12 is cut so that a stopper plate 13 can be inserted. An axis hole 14 is at the center of the gear pipe 8 and a reel shaft 15 is fitted so that it can move back and forth freely. The gear pipe 8, pinion 9 and reel shaft 15 are offset from the axis 6 so that the desired motion can be accomplished. The teeth of the crown gear 5 are cut at an angle to its radial direction and correspondingly, the teeth on the pinion 9 are cut at an angle to the axial direction of the pinion. Since this arrangement well known in the art, no further explanation will be made. Further, on one side of the main body 3, a guide section 17, connected at a neck section 16, is formed in one unit with the main body 3 itself, and a slit 19 is formed by cutting one side wall of the neck section 16 which has an axis hole 18 at the center. Therefore, the rotor 4 can be connected to the main body 3 so that the former is rotatable freely by inserting the stopper 13 through the slit 19 and fixes to the slot 12 of gear pipe 8 after inserting the gear pipe 8 into the axis hole 18 and the round guide section 17 is placed in the round dented section 11. Since the main body 3 and the rotor 4 can be easily assembled or disassembled by fixing or separating the stopper 13, assembly in the plant, pouring of lubricant and disassembly after the use of reel and the inspection of the inside mechanism are very convenient. As the pinion 9 is formed integrally in one unit with the rotor 4, it does not become cranky during the operation, and it is not necessary to reform the teeth of pinion 9 for each instrument since they are made by metal type for casting on which teeth are formed by a precision machine. The complicatedness of the manufacturing process and the assembly process of reel is dissolved and simplified, thus it becomes possible to produce high quality and inexpensive reels in a large scale.

Furthermore, the crown gear 5, which engages with said pinion to transmit the revolution of handle 7 to the rotor 4, is made in one unit with the pipe axis 20 integrally, which has a polygonal internal section 20a which extends above and below the crown gear 5 by a proper length. The unitary crown gear 5 and pipe axis 20 is fixed to the polygonal axis 6 which cross perpendicularly to the gear of the axis pipe 8 and offset therefrom which is laid between the side wall 3a and the cover 3b of the main body 3. The edge 6a protrude from the axis hole 21 of the cover 3b and has the handle 7 fixed thereto by pin 22. In doing so, the polygonal internal section 20a of the pipe axis 20 and the polygonal axis 6 are to be engaged with each other and rotate as a unit.

The other end 6b of the polygonal axis 6 is fitted by screws 23 to the side wall 3a of the main body 3 so that it can be rotated freely. As the crown gear which transmits the revolution of the handle 7 to the rotor 4 and the pipe axis 20 with the polygonal internal section which fits the crown gear to the axis 6 are made as one unit by metal type for casting, the products are uniform and mass production is possible, and they are inexpensive and mutually interchangeable, have beautiful appearance, and do not need secondary work. Further, the complexity in assembling and the secondary work to fit the parts mutually in each product are omitted and the number of the inferior goods is decreased resulting in decrease of the cost and production of quality goods.

Figure 3:
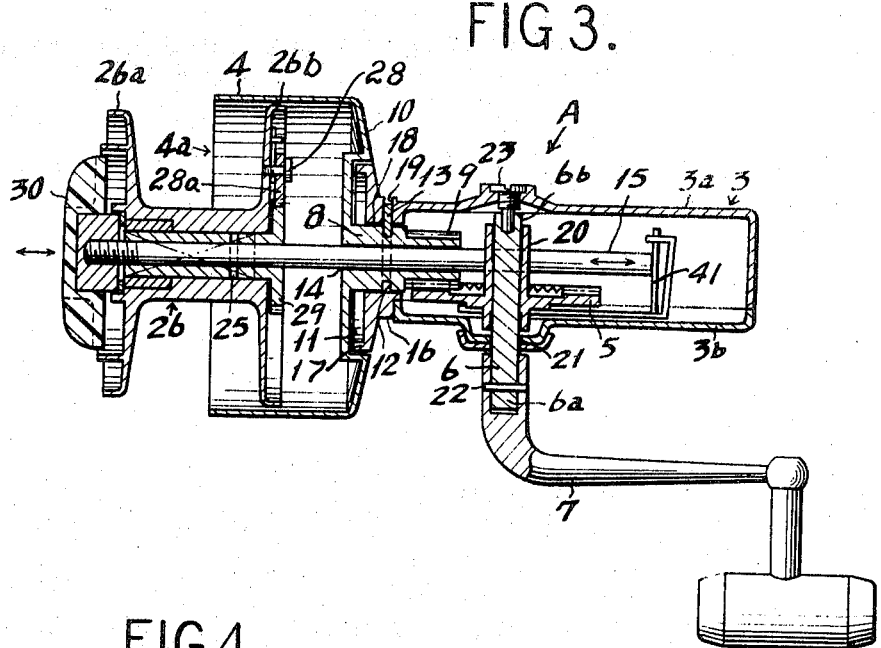
FIG. 3 is a longitudinal section of the reel taken along line III — III, as viewed in the direction of arrows in FIG. 1.
Figure 4:
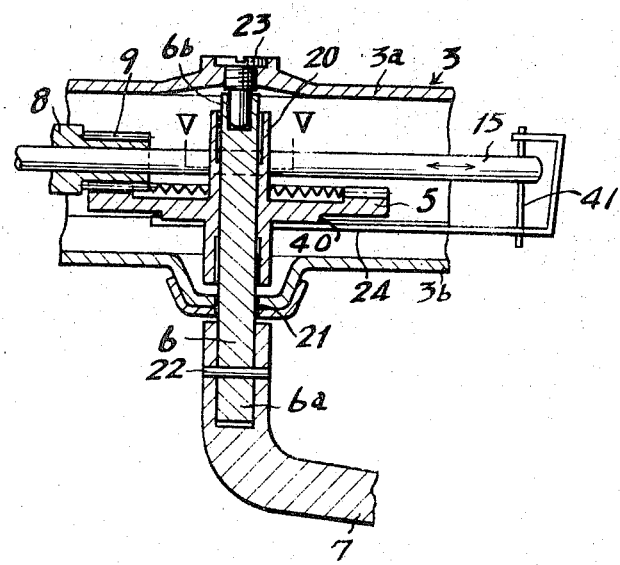
FIG. 4 is an enlargement of a portion of a revolution-transmission assembly in FIG. 3.
Figure 6:
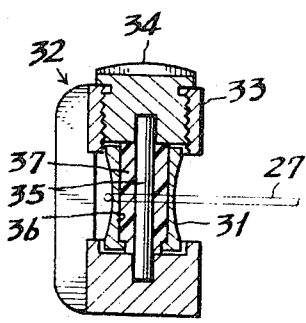
FIG. 6 is an enlargement of the longitudinal section of a bail arm roller taken along lines VI — VI in FIG. 1.
Figure 5:
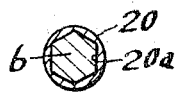
FIG. 5 is a cross section of the portion of FIG. 4 taken along line V — V.

An eccentric cam 24 is secured to eccentric sleeve 40 of axis pipe 24 and is connected to reel shaft 15 by pin 41. The reel shaft 15 is shown partially extended in FIGS. 3 and 4 and consequently eccentric sleeve 40 appears centered in these sectional views. The translation of angular to linear oscillatory motion using an eccentric sleeve is well known. The spool 26 is fixed by a drag knob 30 to the end of the reel shaft 15 and is located within the rotor 4. The spool 26 includes a front wall 26a and a back wall 26b between which the line is wound. The back wall 26b has a nail 28 on its back and a spring 28a which engages a gear 29 which is fixed to the reel shaft 15 by a pin 25. By the revolution of the handle 7 and by the following revolution of the eccentric cam 24, the reel shaft 15 moves back and forth and the spool 26 moves in and out the rotor 4 through the opening 4a, thus the line 27 can be wound to be spool 26 by hanging the line 27 to a roller 31 of a bail arm roller assembly B equipped on the wall of the rotor 4. A bail 32 of the bail arm roller assembly B is assembled to work freely through a bail hinge 33 on a wall of the rotor 4. The roller 31 is arranged rotatably around an axis 35 which is fitted as one body with a closing section 34 which in turn is fixed to the bail 32. Inside of the roller 31 a hole 36 is drilled and axis holder 37, which is made of oil-absorbent synthetic resin with a drilled hole at the center, is fixed to said hole 36 by pressure insertion to form the axis holder of the axis 35. The axis holder 37 mates with the lower section of bail hinge 33 and the closing section 34. This axis holder 37, being oil-absorbent material, does not need the oil supply and smooth revolution is always expected.

Therefore, at the time of fishing, hook a line on a bail arm 38 equipped on the bail hinge 33 and revolve the handle 7, which rotates the rotor 4 together with the bail hinge 33, and the line 27 is wound to the spool 26 by the back and forth movement of the spool 26. The line 27 can be cast from the spool 26 by unhooking the line from the bail arm 38 by rotating it. During winding the line 27, although the water sticked on the line flows into the axis holder, the burning, i.e., the largest defect of the conventional reel, can be avoided as the axis holder 37 is an oil-absorbent synthetic resin. Thus, there appears no influence on the power of revolution of the roller 31 and the winding operation of the roller. There is also an advantage that the cost of the axis holder 37 in this invention is low compared with the conventional axis holder made of super-solid alloy or the like.

What is claimed is:

1. In a spinning reel for fishing including a main body having a handle, a rotor secured to said main body, a spool within said rotor capable of reciprocating motion, a bail arm roller provided around the wall of said rotor, and a revolution transmission assembly for transmitting the revolution of said handle to said rotor in said main body, the improvement comprising a unitary hollow rotor and gear pipe; said gear pipe having integrally at one end a pinion with a slot around the forwarding edge of said pinion; said main body includes a protruded neck section on one edge of saidd main body with an axial hole in which said gear pipe is fitted; a slit in said neck section crossing said axial hole; and a stopper plate engaging with said slot and said slit, for preventing lateral movement between said rotor and said main body during rotation of said rotor.

2. The spinning reel according to claim 1 wherein said revolution-transmission assembly includes a crown gear having integrally a pipe axis of polygonal internal section and engaging said pinion provided on said rotor, a polygonal axis fitting within said crown gear's pipe axis and having said handle fixed at one end thereof.

3. The spinning reel according to claim 1 wherein said bail arm roller includes a bail hinge attached to the exterior wall of said rotor, an axis mounted to said bail hinge, a roller surrounding said axis, and an axis holder made of oil-absorbent synthetic resin separating said axis and said roller.

* * * * *